Patented May 14, 1935

2,001,659

UNITED STATES PATENT OFFICE 2,001,659

PREPARATION OF FORMIC ACID

John C. Woodhouse, Wilmington, Del., assignor to E. I. du Pont de Nemours & Company, Wilmington, Del., a corporation of Delaware No Drawing. Application November 11, 1932, Serial No. 642,239

10 Claims. (Cl. 260—114)

This invention relates to a process for the preparation of formic acid from carbon monoxide and steam and is directed particularly to the use of a new catalyst for the reaction.

It has been known that carbon monoxide and steam will react, in the presence of a suitable catalyst, to give formic acid. As this process is one which employs raw materials that are relatively inexpensive, it should, under favorable conditions, produce the acid at an exceptionally low cost. Its commercial success, however, will in no small part be determined by the catalyst used. Those which have been proposed heretofore have not been entirely satisfactory for commercial operation due to low yield, short life, and other economic considerations. Efforts of investigators in this art have been directed, therefore, to the discovery of catalysts having high activity and which, furthermore, favor the production of formic acid while tending to inhibit the formation of undesirable side products.

An object of the present invention is to provide new catalysts for the preparation of formic acid from carbon monoxide and steam having the above desirable characteristics. Other objects will hereinafter appear.

According to the present invention formic acid is prepared from carbon monoxide and steam by passing these constituents preferably with a halogen, for example, chlorine under suitable temperature and pressure conditions over an absorbent material such as pumice, silica gel, active carbon, and more particularly over activated charcoal. In lieu of the halogens I may use the non-metals, sulfur, tellurium, phosphorus, etc., or any compound which is volatile under the temperature of the reaction and which hydrolyzes or otherwise reacts with the water or other reactant present to give an inorganic acid. The halogens such as chlorines, with steam, give hydrogen chloride and hydrogen oxychloride; the other non-metals giving, according to their nature, and the conditions of the reaction, oxygenated or non-oxygenated acids.

My prefered class of catalysts are the halogens, chlorine, bromine, iodine, and fluorine; chlorine being the preferred halogen. Other catalysts, which are suitable, include the non-metals which react with water to form acids, e. g. sulfur, tellurium, phosphorus, and other compounds, organic or inorganic, which in the presence of steam or other reactants and the conditions of the reaction form acids. Compounds coming under this heading include the volatile halogen compounds such as ammonium chloride, carbon tetrachloride, methyl, ethyl, and the other alkyl halides, the aromatic halides, benzyl chloride, tolyl chloride, methyl, ethyl, and the other mercaptans, methyl phosphine, methyl nitrate, ethyl hydroselenide, sulfuryl chloride, antimony chloride, chromyl chloride, manganese perchloride, etc. In fact, any compound or element, volatile at the temperature of the reaction, in order that it may be injected into the reaction zone in the vapor phase, and which will form an acid when present therein, are suitable. It is understood, however, that for uniformly high yields and best overall operating conditions I prefer to use the halogens and of the halogens chlorine, due to its availability and excellent operating characteristics.

The carbon monoxide required for this synthesis may conveniently be derived from various commercial sources, such as, for example, water-gas, producer gas, etc., by liquefaction or others methods, and should likewise for the best results be relatively pure.

Inert gases, such as nitrogen, carbon dioxide, etc., may be included with the reactants, altho this is usually undesirable as the reaction equilibrium is such that in order to obtain satisfactory conversion the partial pressures of the reactants should be high.

I prefer generally to conduct the reaction at pressures in excess of atmospheric, say from 100–1000 atmospheres or higher. The reaction proceeds over a wide range of temperatures employing the above described catalyst, depending upon the gaseous composition employed. The desired conversion of the carbon monoxide and steam to formic acid can be obtained at a temperature of from 100–400° C., although I usually prefer to conduct the reaction in the range of from 200–300° C.

The following example will illustrate one method of practising the invention, although the invention is not limited thereto.

*Example.*—A gaseous mixture containing 69 parts by volume of carbon monoxide, 25 parts by volume of steam, the mixture containing 0.25% chlorine is passed over activated charcoal disposed in a reaction chamber suitable for conducting exothermic gaseous reactions. The reaction is conducted at a temperature of 325° C. and a pressure of 700 atmospheres. A good yield of formic acid is obtained.

The apparatus which may be employed for conducting the reaction may be of any conventional type and preferably one in which the temperature can be readily controlled. Owing to the corrosive action of formic acid, the interior of the converter and conduits therefrom should preferably be protected. This may be accomplished by using glass or glass-lined apparatus or by coating the inner surfaces of the apparatus with silver or using for the construction of this equipment acid-resisting alloys of, for example, molybdenum, cobalt, tungsten, chromium, manganese, or nickel.

Various changes may be made in the method of employing the above catalysts for the preparation of formic acid from carbon monoxide and steam without departing from this invention or sacrificing the advantages that may be derived therefrom.

I claim:

1. In a process for the preparation of formic acid from carbon monoxide and steam the step which comprises effecting the reaction in the presence of a volatile inorganic acid catalyst which is continuously formed in situ.

2. In a process for the preparation of formic acid from carbon monoxide and steam the step which comprises effecting the reaction in the presence of a volatile inorganic acid catalyst which is continuously formed in situ and an absorbent material.

3. In a process for the preparation of formic acid from carbon monoxide and steam the step which comprises effecting the reaction in the presence of a volatile inorganic acid catalyst which is continuously formed in situ and active carbon.

4. In a process for the preparation of formic acid from a gaseous mixture containing carbon monoxide and steam the step which includes passing the gaseous mixture together with a catalyst into the reaction chamber, the catalyst existing in the vapor phase at the temperature of the reaction and reacting with the gaseous mixture to form a volatile inorganic acid.

5. In a process for the preparation of formic acid from a gaseous mixture containing carbon monoxide and steam the step which includes passing the gaseous mixture together with a catalyst over an absorbent material, the catalyst existing in the vapor phase at the temperature of the reaction and reacting with the steam to form a volatile inorganic acid.

6. In a process for the preparation of formic acid from a gaseous mixture containing carbon monoxide and steam the step which includes passing the gaseous mixture together with a catalyst over active carbon, the catalyst existing in the vapor phase at the temperature of the reaction and reacting with the steam to form a volatile inorganic acid.

7. In a process for the preparation of formic acid from carbon monoxide and steam the step which comprises effecting the reaction in the presence of halogen as the catalyst.

8. In a process for the preparation of formic acid from carbon monoxide and steam the step which comprises effecting the reaction in the presence of chlorine as the catalyst.

9. In a process for the preparation of formic acid from carbon monoxide and steam the step which comprises passing the carbon monoxide and steam together with chlorine over activated charcoal.

10. In a process for the preparation of formic acid from carbon monoxide and steam the step which comprises passing carbon monoxide, steam, and a non-metal, which reacts with water to form acids, into the reaction.

JOHN C. WOODHOUSE.